United States Patent Office 2,964,408
Patented Dec. 13, 1960

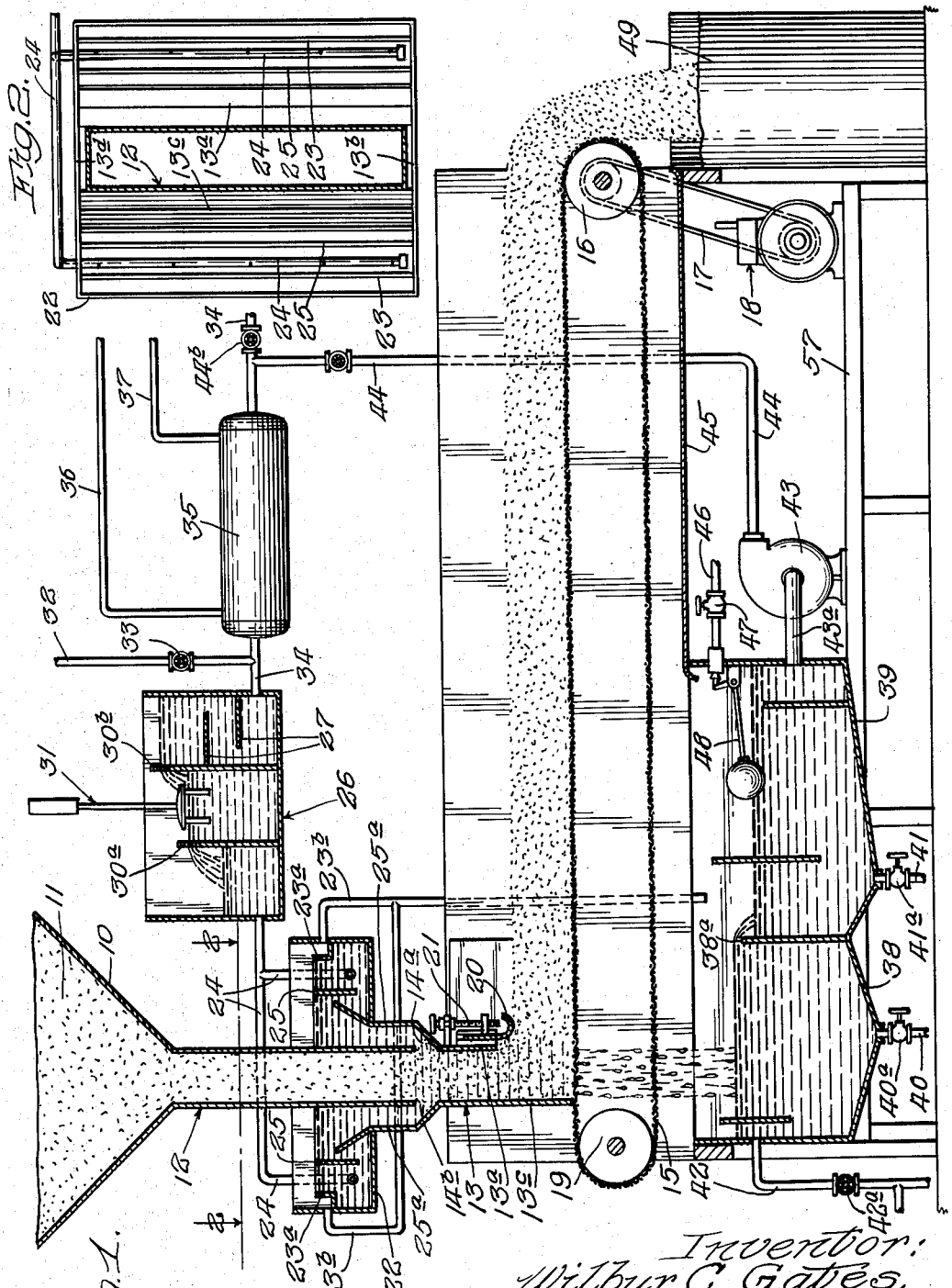

2,964,408

PROCESS FOR TEMPERING CEREAL GRAINS

Wilbur C. Gates, Flossmoor, Ill., assignor, by direct and mesne assignments, of one-half to Chicago Bridge & Iron Company, Chicago, Ill., a corporation of Illinois, and one-half to Baerguard, Inc., Chicago, Ill., a corporation of Illinois Filed Apr. 25, 1955, Ser. No. 503,395

4 Claims. (Cl. 99—80)

This invention relates to apparatus for and a method of liquid tempering flowable, liquid absorbing material.

The invention is particularly adaptable to liquid tempering of grain such as rice, wheat, oats, and the like. It may also be employed for treating other liquid absorbing materials which are in granular or fibrous form and flowable.

In recent years it has become increasingly important to achieve uniform liquid tempering, i.e., uniform liquid content, of large amounts of cereal grains prior to subsequent treatment of such grains. This is particularly important in conditioning certain cereal grains such as rice prior to vacuum puffing.

In the past, uniform liquid tempering of flowable, liquid absorbing materials such as grain was attempted by forming batches of the grain, pouring a liquid such as water over each batch, allowing the excess water to drain down through the batch and out the bottom, and then allowing the wetted batch to stand under substantially constant pressure and temperature conditions until the desired increased average moisture content of the grain was achieved. Such a technique was very cumbersome; its operation time consuming and expensive; and portions of the batch contained much greater amounts of moisture than others due to channeling of the batch caused by drainage of the water therethrough. In addition, the bottom portion always contained a greater moisture content than the upper portion. When treating large batches of rice in this manner as a preliminary to vacuum puffing so as to form a quick-cooking or ready-to-eat cereal product, it was necessary that the temperature of the water be approximately the same as that of the rice batch.

This invention provides a greatly improved apparatus for and method of liquid tempering flowable, liquid absorbing material. It achieves continuous, controlled and uniform liquid tempering of such materials as cereal grains. Subsequent breakage in handling of the cereal grains is greatly decreased, and deformity and caking of any portions of the material being liquid tempered is avoided.

When employing this invention for water tempering of rice grains prior to vacuum puffing, the necessity of employing water at substantially the same temperature as the rice grains to be tempered is avoided. In addition, vacuum puffed rice grains tempered in accordance with this invention contain markedly less non-utilizable clusters than rice grains tempered in accordance with the prior batch technique.

In its preferred form, this invention also includes the simultaneous washing and wetting of the material to be liquid tempered followed by draining off of excess liquid. The invention is particularly adapted for use in uniformly water tempering cereal grains prior to vacuum puffing since uniform moisture content throughout the grains which are to be vacuum puffed is essential.

The invention is illustrated in the preferred embodiment in the accompanying drawings in which:

Figure 1 is a diagrammatic side elevational view of the liquid tempering apparatus with much of the supporting structure omitted for purposes of clarity.

Figure 2 is a sectional plan view of the liquid feed tank taken substantially along line 2—2 of Figure 1.

Belt conveyor

Figure 1 shows a liquid tempering apparatus incorporating the features of this invention.

As here shown, an endless, generally horizontally positioned belt 15 operates over two pulleys, a guide pulley 19 at the feed end of the belt, and a drive pulley 16 at the discharge end of the belt. A wet, flowable, liquid absorbing material 11 is deposited on the upwardly facing portion of the feed end of the belt 15 and is moved at a predetermined speed towards the discharge end. A variable speed motor 18 is employed to drive the endless belt 15 over the pulleys 16 and 19 at a predetermined speed. The drive gear of the motor 18 is connected to the drive pulley 16 by means of a chain belt 17.

It is preferred that the belt 15 be foraminous so that excess water about the granular material deposited on the belt drains readily.

The rate of speed of the belt 15 and/or its effective length of travel, i.e., the length of the upwardly facing portion, may be varied depending upon the amount of time that it is desired to permit the material to remain on the belt in order that the wetted material on the belt have sufficient time so that each particle has substantially the same desired increased moisture content.

Material conduit

As here shown, a generally rectangular-shaped conduit 12 leads from the bottom of a hopper 10 through a liquid feed tank 22, to the feed end of the upwardly facing surface of the belt 15. This conduit serves to conduct flowable, liquid absorbing material 11, contained in the hopper 10 located above the belt 15, onto the belt.

As the material 11 flows through the conduit 12, it is wetted with liquid, such as water or an acid-water mix, by causing the liquid to flow in a continuous stream against the material through openings 14a and 14b in the conduit 12. These openings are located between the bottom of the hopper 10 and the belt 15.

It is important that the liquid be fed under a head of pressure and in such a manner as to wet substantially uniformly all of the material in the stream-like mass flowing through the conduit.

As here shown, the conduit 12 has an upper portion and a lower portion 13. The upper portion may have any cross sectional shape, but is preferred that the lower portion have a generally rectangular shape consisting of a back side 13c, two end sides 13b and 13d, and a front side 13a. The two opposed openings 14a and 14b in the conduit 12 are here shown located in the lower portion 13 of the conduit 12 and it is preferred that these openings be rectangular in shape and of substantially the same dimensions, and extend horizontally across the opposing sides 13a and 13c of the conduit 12.

It is necessary that the lower portion 13 of the conduit 12 immediately above the belt 15 be generally rectangular in shape with the back side 13c and the two end sides 13b and 13d of the conduit 12 terminating at points immediately above the upwardly facing surface of the belt 15 at the feed end. The front side 13a of the conduit 12 must terminate at a predetermined distance above the upwardly facing surface of the belt 15 equal to the desired height of the layer of material 11 to be deposited on the belt when the upwardly facing surface of the belt is moving at a predetermined speed in a direction from the guide pulley 19 to the drive pulley 16, and while the material 11 is flowing through the conduit 12. Thus, the stream-like mass of material 11 is caused to have a generally rectangular cross section as it is deposited on the moving upwardly facing portion of the belt 15. In this way each particle so deposited on the belt 15 receives substantially the same amount of wetting whether the particle be located in the middle of the stream-like mass or along the sides. Upon deposition of the material 11 onto the belt 15, excess wetting of the particles on the bottom portion of the belt is also avoided as a result of the belt 15 being foraminous and the stream-like mass of the material 11 being deposited on the belt having a generally rectangular-shaped cross-sectional area.

The thickness of the layer of material being deposited on the belt 15 may be varied by means of an adjustable plate 20 which is slidably mounted against the front side 13a of the conduit 12 so that it can be moved up and down. This plate extends horizontally across the front side 13a of the conduit 12 and is adapted to be raised and lowered below the terminating end of the front side 13a of the conduit 12 by means of a threaded screw 21. Preferably, the thickness of the material is controlled to approximately three to four inches in a horizontal layer.

When water tempering rice which is to be vacuum puffed, it is preferred that the distance between the back side 13c and the front side 13a of the generally rectangular-shaped lower portion 13 of conduit 12 be equal to the distance between the upwardly facing surface of the belt 15 and the terminating end of the front side 13a of conduit 12, i.e., the thickness of the material 11 on the belt 15. It has been found that optimum wetting of the rice grains is thus achieved.

When employing water as the liquid it is preferred to feed the water into the lower portion 13 of conduit 12 through the openings 14a and 14b therein at a sufficient head of pressure whereby the water travels through the stream-like mass of material 11 flowing through the conduit 12 at a speed greater than the speed of the material. In this way, the material 11 is washed and wetted simultaneously. The excess water flows through the foraminous belt.

In order to provide a substantially constant flow of liquid at a predetermined head of pressure through the openings 14a and 14b in the conduit 12 there is provided a liquid feed tank 22 having an opening in its bottom through which the conduit 12 passes. This liquid feed tank 22 is mounted above the belt 15. As here shown, the opening at the bottom of the feed tank 22 is rectangular in shape with the width of the rectangular opening being substantially greater than the width of the rectangular-shaped conduit 12. Two plates 25a extend above and below the longitudinal sides of the rectangular opening in the bottom of the tank 22 and are connected to the bottom of the rectangular openings 14a and 14b in the conduit 12. In this way, a throat is provided on each side of the conduit whereby water flows from the liquid feed tank 22 into the openings 14a and 14b in the conduit 12. This prevents any back up of the flowing material 11 in conduit 12 into the liquid feed tank 22.

Liquid, such as water and acid, is fed from a source to be described below into the liquid feed tank 22 by means of pipes 24 which empty into the liquid feed tank. Vertically extending baffle plates 25 are mounted in the liquid feed tank 22 so as to aid in achieving a uniform rate of flow of liquid into the conduit 12 from the liquid feed tank 22. In addition, openings are provided at a predetermined height in the side walls of the liquid feed tank 22 to permit drainage from the feed tank of any excess water being fed therein. To permit maintenance of a substantially constant level of liquid in the feed tank 22 and thereby achieve a substantially constant, predetermined head of liquid pressure at the opening 14a and 14b of the conduit 12, right angle plates 23a are provided. The horizontal portion of these plates extends inwardly from the side wall below the openings therein and the vertical portion extends upwardly beyond the openings.

Drain pipes 23b are connected to the openings in the side wall of the liquid feed tank 22 and are here shown emptying into drainage tanks 38 and 39 located below the belt 15.

Liquid supply to liquid feed tank

As here shown, there is provided a water pipe line 34 leading from a source of water (not shown) through a heating tank 35 and then into a mixing well 26. The heating tank 35 is here shown as being heated by means of steam fed into the tank by a pipe line 36 leading from a source of steam (not shown) and out through an exhaust pipe 37. Steam pipes 36 and 37 are connected to heating coils in the tank 35 (not shown).

In the treatment of cerial grains, such as rice, it frequently is desirable to temper them with a liquid mixture of water and acid. In order to mix the acid with the water, there is provided an acid pipe line 32 leading from a source of acid (not shown) through a flow control valve 33 to the water pipe line 34 at a point between the source of water and the mixing well 26. The mixing well 26 is provided with a series of vertically extending baffles 30a and 30b together with horizontally extending baffles 27 so as to achieve a thorough mixing of the water and acid in the mixing well prior to emptying the acid-water mix from the mixing well 26 into the liquid pipe line 24, which leads from an opening in the mixing well 26 and empties into the liquid feed tank 22 described above.

A pH metering device 31 is mounted in the mixing well so that the proper degree of acidity can be maintained. In the event that the desired degree of acidity of the acid-water mix changes, control valve 33 in the acid pipe line 32 may be readily adjusted so as to decrease or increase the flow of acid into the water pipe line 34.

Recirculating system

In order to improve the efficiency of the liquid tempering apparatus of this invention, there is provided a recirculating system for feeding the excess liquid drained from the material 11 back into the liquid feed tank 22. As here shown, this system includes two drain tanks 38 and 39 located directly below the foraminous, endless belt 15 at the feed end portion. The excess liquid flowing in the conduit 12 drains from the flowable material 11 being deposited on the upwardly facing surface portion of the endless belt 15 into these tanks.

The tanks 38 and 39 are here shown adjacent one another with a common wall 38a and having closed hoppered bottoms with drain pipes 40 and 41, respectively, leading from the bottom of the tanks. Each of the drain pipes 40 and 41 contains valves 40a and 41a, respectively, for opening and closing the pipes. A drainage pan 45 is mounted below the discharge end portion of the belt and is so positioned that any excess water draining from the material traveling on the foraminous belt 15 drops onto this pan and the liquid flows over the pan and into the drainage tank 39.

It is to be noted that tank 38 is located directly below the conduit 12. Thus, the bulk of the liquid flowing in the conduit 12 empties into tank 38 together with any small solid matter washed from the material 11. A substantially constant height of liquid is maintained in tank 38 by providing an opening in the side wall thereof at a predetermined height and having connected to this opening a drainage pipe 42 equipped with a flow control valve 42a.

The liquid in tank 38 is permitted to flow into adjacent tanks 39 by spilling over the common wall 38a. In this way, any solid particles of matter which flow into tank 38 from conduit 12 settle to the bottom of tank 38 and do not get into tank 39.

A substantially constant height of liquid is also maintained in tank 39 by providing a float valve 48 mounted on the upper portion of the side wall thereof. This float valve is connected to a water pipe line 46 connected to a source of water (not shown). The rate of flow of water through this pipe 46 is controlled by a valve 47 in this line. When the liquid level in tank 39 becomes too low, the float valve 48 lowers, causing water to flow from the water pipe line 46 into the tank 39. When the liquid level reaches a predetermined height, the float valve rises to a position shutting off water flow from pipe 46 into tank 39.

A pipe 43a leads from an opening in the side wall of tank 39 to the intake of recirculating pump 43. The discharge end of the recirculating pump 43 is connected to the water supply line 34 at a point between the control valve 44b in the water pipe line 34 and entry of this pipe into the heating tank 35 by means of a valve controlled pipe line 44. Thus, the excess liquid which is drained from the material 11 being deposited on the endless, foraminous belt 15 is recirculated through the heating tank 35, into the mixing well 26, and back into liquid feed tank 22.

In operation, the flowable, liquid absorbing material 11 in the hopper 10 is fed downwardly in the form of a flowing stream-like mass through the conduit 12. This flowing stream-like mass is caused to have a generally rectangular-shaped cross section upon deposition of the material 11 onto the belt 15. As here shown, this is accomplished by having the lower portion 13 of conduits 12 generally rectangular in cross section. While the material 11 is flowing through conduit 12, a continuous stream of liquid from the liquid feed tank 22 is directed against the stream-like mass of material under a head of pressure and in such a manner as to wet substantially uniformly all of the material being deposited on the belt 15. The upwardly facing portion of the endless belt 15 is caused to move from the feed end of the belt to the discharge end at a predetermined rate of speed by means of a motor 18 connected to the drive pulley 16 by means of a chain belt 17. In this way, continuous wetting and tempering of the material is achieved. The thickness of the material 11 deposited on the moving belt 15 is controlled by means of the adjustable plate 20 mounted on the conduit at the terminal end thereof and this material is then discharged from the belt into a hopper 49. The rate of speed of the moving belt and the thickness of the layer of material on the belt is coordinated so as to permit the desired degree of substantially uniform liquid tempering of the material 11 during travel on the belt 15.

It is preferred that the liquid from the liquid feed tank 22 be supplied in such quantities and under sufficient head of pressure so as to travel through the stream-like mass of material 11 in the conduit 12 at a speed greater than the speed of the material 11, thereby washing the material 11 as well as wetting it.

The above-detailed description of this invention is given for clearness of understanding only. No unnecessary limitations should be understood therefrom, as modifications will be obvious to those skilled in the art.

I claim:

1. The method of continuously tempering flowable, liquid-retaining bulk material consisting essentially of cereal grain, which comprises: feeding a flowing stream of the material in a substantially downward path which is terminated by a substantially horizontal, non-wetting propelling path; directing a continuous stream of aqueous liquid under a substantially constant, pre-determined head of pressure against substantially all said flowing material in said downward path and permitting said falling material to pass through said liquid, thereby enabling said liquid to wet substantially uniformly all of said material flowing in said downward path; collecting the wetted mass at the terminus of said downward path and said horizontal propelling path in the form of a layer having a substantially rectangularly-shaped cross sectional area; propelling said layer of wetted mass at said terminus in said horizontal path in the form of a layer of wetted material having substantially uniform thickness; progressively draining liquid downward through said substantially uniform layer of wetted mass and removing said draining liquid from said wetted mass during the movement of said layer in said horizontal path; the rate of speed and thickness of said layer of the wetted material being propelled in said horizontal path being coordinated to permit the desired degree of substantially uniform liquid tempering of the material; and discharging drained material from said horizontal path having a substantially uniform, pre-determined liquid content.

2. The method of claim 1 in which said aqueous liquid is supplied to said substantially vertical path in excess and travels through said vertical path at a speed materially greater than that of the bulk material, thereby washing the material as well as tempering the same.

3. The method of claim 1 in which the thickness of the layer of wetted material in said substantially horizontal path is maintained at a thickness of about 3 to 4 inches until being discharged from said horizontal path.

4. The method of claim 1 in which the bulk material comprises rice.

References Cited in the file of this patent

UNITED STATES PATENTS

| | | |
|---|---|---|
| 13,397 | Postley | Aug. 7, 1855 |
| 1,061,933 | Willford | May 13, 1913 |
| 1,239,555 | Baumgartner | Sept. 11, 1917 |
| 1,647,704 | Lea | Nov. 1, 1927 |
| 1,870,159 | Anderson | Aug. 2, 1932 |
| 2,491,194 | McShea | Dec. 13, 1949 |
| 2,625,944 | Bloom | Jan. 20, 1953 |
| 2,637,434 | Harper | May 5, 1953 |
| 2,669,241 | Foote | Feb. 16, 1954 |
| 2,686,192 | Bonotto | Aug. 10, 1954 |